US012139222B2

(12) United States Patent
Baranyai et al.

(10) Patent No.: US 12,139,222 B2
(45) Date of Patent: Nov. 12, 2024

(54) TORQUE SENSOR HAVING INDUCTIVELY COUPLED, INTERMESHING COMPONENTS

(71) Applicants: thyssenkrupp Presta AG, Eschen (LI); thyssenkrupp AG, Essen (DE)

(72) Inventors: Zoltán Baranyai, Herceghalom (HU); Gergely Daloki, Budapest (HU); Laszlo Fekete, Liter (HU); Gergely Racz, Budapest (HU); Adorjan Kovacs, Budapest (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 449 days.

(21) Appl. No.: 17/599,355

(22) PCT Filed: Mar. 31, 2020

(86) PCT No.: PCT/EP2020/059077
§ 371 (c)(1),
(2) Date: Sep. 28, 2021

(87) PCT Pub. No.: WO2020/201262
PCT Pub. Date: Oct. 8, 2020

(65) Prior Publication Data
US 2022/0177031 A1 Jun. 9, 2022

(30) Foreign Application Priority Data
Apr. 2, 2019 (DE) .................. 10 2019 108 516.0

(51) Int. Cl.
*G01L 5/22* (2006.01)
*B62D 6/10* (2006.01)
*G01L 3/10* (2006.01)

(52) U.S. Cl.
CPC ............. *B62D 6/10* (2013.01); *G01L 3/105* (2013.01); *G01L 5/221* (2013.01)

(58) Field of Classification Search
CPC ... B62D 6/10; G01L 3/105; G01L 5/221; G01L 3/1435; G01B 7/14
(Continued)

(56) References Cited

U.S. PATENT DOCUMENTS 4,356,732 A 11/1982 Hachtel et al.
7,762,148 B2 7/2010 Shimizu et al.
(Continued)

FOREIGN PATENT DOCUMENTS

CN 201021909 Y 2/2008
CN 201594026 U 9/2010
(Continued)

OTHER PUBLICATIONS

English Translation of International Search Report issued in PCT/EP2020/059077, dated Jul. 7, 2020.

*Primary Examiner* — Robert R Raevis
(74) *Attorney, Agent, or Firm* — thyssenkrupp North America, LLC

(57) ABSTRACT

A torque sensor can measure torque introduced into an upper shaft that is rotatable around a longitudinal axis and is connectable to a lower shaft via a torsion rod. A first component is connectable to the upper shaft, and a second component is connectable to the lower shaft. The components have surfaces that protrude in a longitudinal direction and at least partially overlap. A sensor coil that can generate a high-frequency alternating magnetic field is arranged on one of the surfaces of one component, and a metallic element is arranged on one of the surfaces of the other component. A torque introduced into the upper shaft causes a change in distance between the sensor coil and the metallic element. A device can measure a frequency change of the alternating magnetic field caused by the change in distance and determine the torque introduced into the upper shaft.

10 Claims, 4 Drawing Sheets

(58) Field of Classification Search
USPC ............ 73/862.06, 862.191, 862.29, 862.31, 73/862.321, 862.325, 862, 331, 862.332, 73/862.331–862.336, 862.08, 862.09, 73/862.17; 33/600; 280/5.51, 5.511, 735
See application file for complete search history.

(56) References Cited

U.S. PATENT DOCUMENTS

| | | |
|---|---|---|
| 8,307,720 B2 | 11/2012 | Kaschner |
| 2002/0189371 A1 | 12/2002 | Nakane et al. |
| 2003/0209087 A1 | 11/2003 | Nakane et al. |
| 2004/0112146 A1 | 6/2004 | Islam et al. |
| 2004/0194559 A1 | 10/2004 | Nakamura et al. |
| 2006/0137474 A1 | 6/2006 | Nakane et al. |
| 2007/0074588 A1 | 4/2007 | Harata et al. |
| 2010/0289485 A1 | 11/2010 | Eggimann |
| 2016/0214648 A1 | 7/2016 | Schoepe et al. |
| 2017/0003182 A1 | 1/2017 | Schweizer et al. |
| 2018/0170432 A1 | 6/2018 | Chowdhury et al. |
| 2018/0306654 A1 | 10/2018 | Stephan et al. |
| 2019/0047619 A1 | 2/2019 | Toth et al. |

FOREIGN PATENT DOCUMENTS

| | | | |
|---|---|---|---|
| CN | 104870958 A | 8/2015 | |
| CN | 108351262 A | 7/2018 | |
| CN | 108698640 A | 10/2018 | |
| CN | 208171172 U | 11/2018 | |
| DE | 29 51 148 A1 | 7/1981 | |
| DE | 4206382 A1 * | 9/1993 | ........... G01D 5/2216 |
| DE | 102 22 118 A1 | 11/2002 | |
| DE | 60 2004 006 041 T2 | 9/2007 | |
| DE | 102007058657 A1 | 8/2008 | |
| DE | 10 2009 021 191 A1 | 11/2010 | |
| EP | 1659384 A1 * | 5/2006 | ............... B62D 6/10 |
| EP | 1821089 A1 * | 8/2007 | |
| EP | 1 772 715 B1 | 8/2011 | |
| WO | 9905493 A1 | 2/1999 | |

* cited by examiner

TORQUE SENSOR HAVING INDUCTIVELY COUPLED, INTERMESHING COMPONENTS

CROSS REFERENCE TO RELATED APPLICATIONS

This application is a U.S. National Stage Entry of International Patent Application Serial Number PCT/EP2020/059077, filed Mar. 31, 2020, which claims priority to German Patent Application No. DE 10 2019 108 516.0, filed Apr. 2, 2019, the entire contents of both of which are incorporated herein by reference.

FIELD

The present disclosure generally relates to torque sensors, including torque sensors for electromechanical auxiliary power steering systems of motor vehicles.

BACKGROUND

Torque sensors conventionally have a rotation angle sensor. Here, two shaft parts that can be rotated relative to each other to a limited extent are elastically coupled to each other via a torsion spring. When one shaft part is turned relative to the other shaft part by a torque applied by the driver of the vehicle, the relative angle of rotation is essentially proportional to the torque introduced. For an accurate determination of the torque, it is important to be able to measure the angle of rotation precisely.

Conventionally, the turning of the shaft parts relative to each other is determined by measuring the angle of rotation of the shaft parts relative to a fixed sensor housing. The mechanical movement between the shaft parts and the housing is large and ultimately limits the accuracy of the sensor. Magnetic flux-based sensors are commonly used, which are less sensitive to this misalignment, but are also less accurate.

From the prior art, for example from the disclosure documents DE 29 51 148 A1 and DE 10 2009 021 191 A1, it is known to use inductive angle sensors, which have high accuracy, for the contactless detection of a rotation angle and/or a torque.

Thus a need exists for a torque sensor that has increased accuracy and a reduced influence of an existing magnetic interference field on the determination of the torque value.

DETAILED DESCRIPTION

Figure 1:
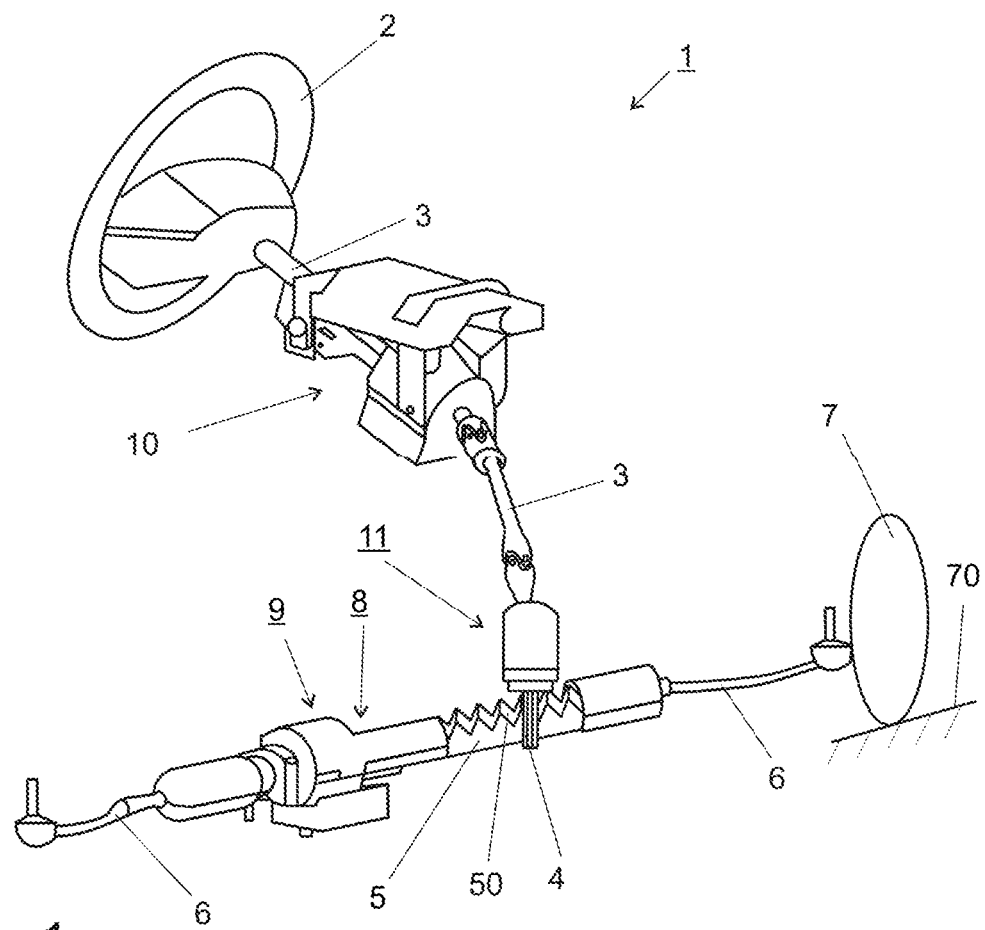
FIG. 1 is a schematic view of an example electromechanical power steering system.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a torque sensor is provided for the measurement of a torque introduced into an upper shaft of a motor vehicle, wherein the upper shaft, which is rotatable about a longitudinal axis, is connected to a lower shaft via a torsion rod. The torque sensor has two components intermeshing in the longitudinal direction of the longitudinal axis, wherein a first component can be connected to the upper shaft and a second component can be connected to the lower shaft, and wherein the components have surfaces protruding in the longitudinal direction, wherein the surfaces of one component at least partially overlap associated surfaces of the other component in the longitudinal direction, and wherein the torque sensor has at least one sensor pair, wherein a sensor pair has a sensor coil, which can generate a high-frequency alternating magnetic field, arranged on one of the surfaces protruding in the longitudinal direction of a component and a metallic element arranged on one of the surfaces protruding in the longitudinal direction of the other component, and wherein a torque introduced into the upper shaft causes a change in the distance between the sensor coil and the metallic element, wherein the torque sensor comprises a device which is set up to measure a frequency change of the alternating magnetic field caused by the change in distance and to determine from this the torque introduced into the upper shaft. Preferably, two pairs of sensors are provided. The inductive torque sensor thus has a reduced susceptibility of the measurement to stray fields as well as mechanical tolerances. To increase redundancy, more than two pairs of sensors may be provided.

Preferably, each of the two components has at least two surfaces, wherein a sensor coil is arranged on a first surface and a metallic element is arranged on a second surface and wherein the sensor coil and the metallic element point away from each other. However, it may also be provided that one of the components carries only the sensor coils and the other component carries only the metallic elements, so that only the component with the sensor coils requires a power supply. Due to the presence of at least two surfaces per component, the direction of the torque can also be determined, since the distance between the elements of one sensor pair decreases, while the distance between the elements of the other sensor pair increases and vice versa.

In order for the signal to be strong enough, it is advantageous if the sensor coil of one component and the metallic element of the other component are oriented to each other and are at an immediate distance from each other.

Preferably, the components surround the respective shaft concentrically and are essentially of a cylindrical design.

In one embodiment, the components have a circular base plate from which at least one protrusion protrudes, which extends over a circular sector, and which forms the mentioned surfaces on lateral end faces, which extend in the longitudinal direction and along the radius. Preferably, the surfaces mentioned are flat.

Two protrusions per component are preferably provided, which are designed in the same way and are arranged along the circumference symmetrically around the longitudinal axis on a common side of the base plate.

The two components are advantageously of an identical design.

The electronics required for frequency measurement are preferably arranged on the surface of the base plate of a coil-bearing component.

Since the components rotate with the shafts, the power supply and the transmission of the measurement signals of the sensor pairs are preferably performed wirelessly. It is advantageous if a WPT coil (Wireless Power Transfer) is arranged on the surface or end face of the base plate of the coil-bearing component, which is set up to receive electrical energy inductively from a primary coil connected to a sensor housing.

Preferably, signal coupling coils are arranged on the circumferential surface of the base plate of the coil-bearing component, which are set up to transmit the digital output signals of the sensor pairs to a secondary coil attached to the stationary sensor housing.

Furthermore, an electromechanical power steering system for a motor vehicle is provided, comprising an upper shaft connected to a steering wheel and a lower shaft connected to the upper shaft via a torsion rod, a previously described torque sensor and an electric motor to support a steering movement introduced into the steering wheel by a driver depending on the torque measured by the torque sensor.

In FIG. 1, an electromechanical motor vehicle power steering system 1 with a steering wheel 2, which is rotationally fixedly coupled to an upper shaft 3, is schematically depicted. By means of the steering wheel 2, the driver introduces a corresponding torque into the upper shaft 3 as a steering command. The torque is then transferred via the upper shaft 3 and a lower shaft 30 to a steering pinion 4. The pinion 4 meshes in a known way with a toothed segment 50 of a rack 5. The steering pinion 4 together with the rack 5 forms a steering gear. The rack 5 is connected at its free ends to tie rods 6 via ball joints which are not shown. The tie rods 6 themselves are connected to a steered wheel 7 of the motor vehicle in a known manner via steering knuckles. A rotation of the steering wheel 2 leads via the connection of the steering shafts 3,30 and the pinion 4 to a longitudinal displacement of the rack 5 and thus to turning of the steered wheels 7. The steered wheels 7 experience a retroactive effect from a road 70, which counteracts the steering movement. To turn the wheels 7, therefore, a force is required, which requires a corresponding torque on the steering wheel 2. An electric motor 8 of a servo unit 9 is provided to assist the driver in this steering movement. The servo unit 9 can be coupled as an auxiliary power supporting device 9, 10, 11 either to a steering shaft 3, the steering pinion 4 or the rack 5. The respective auxiliary power supporting device 9,10,11 introduces an auxiliary torque into the steering shaft 3, the steering pinion 4 and/or into the rack 5, which supports the driver in the steering work. The three different auxiliary power supporting devices 9,10,11 shown in FIG. 1 show alternative positions for their arrangement. Usually, only one of the positions shown is occupied by an auxiliary power supporting device. The servo unit can be arranged as superposition steering on the steering column or as an auxiliary power supporting device on the pinion 4 or the rack 5.

Figure 2:
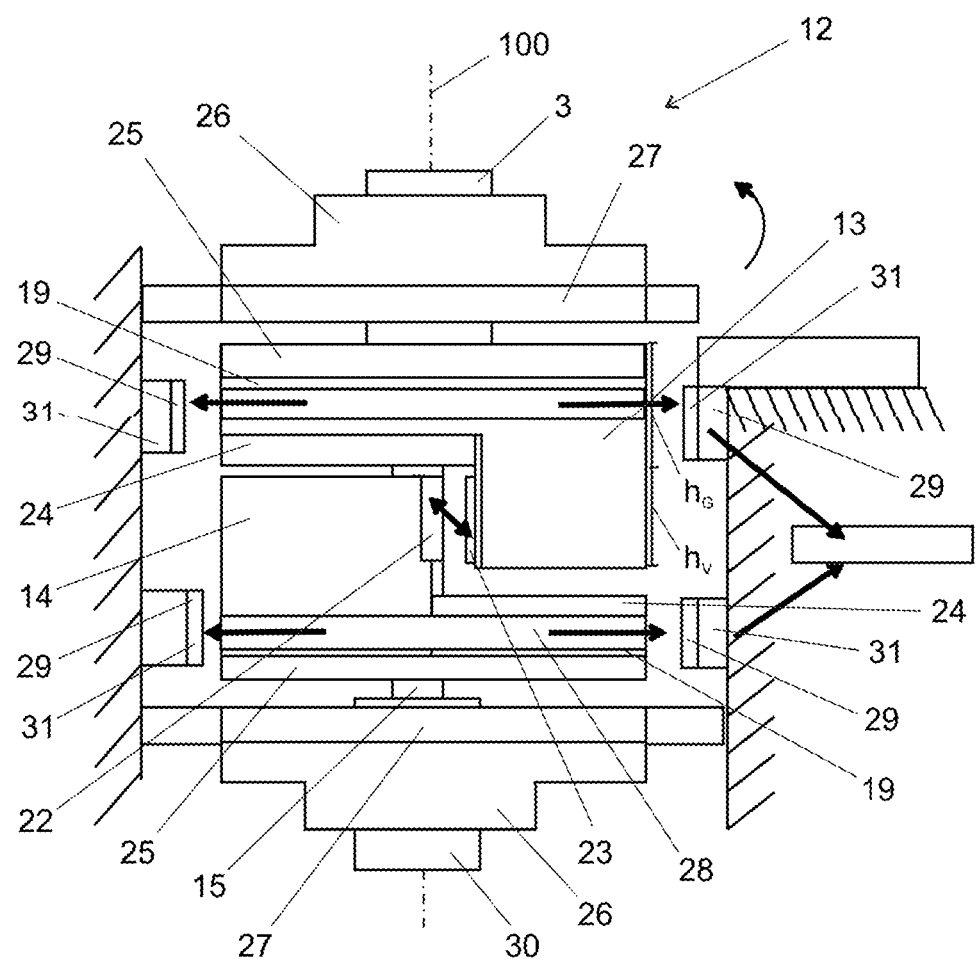
FIG. 2 is a longitudinal sectional view through an example torque sensor.
Figure 3:
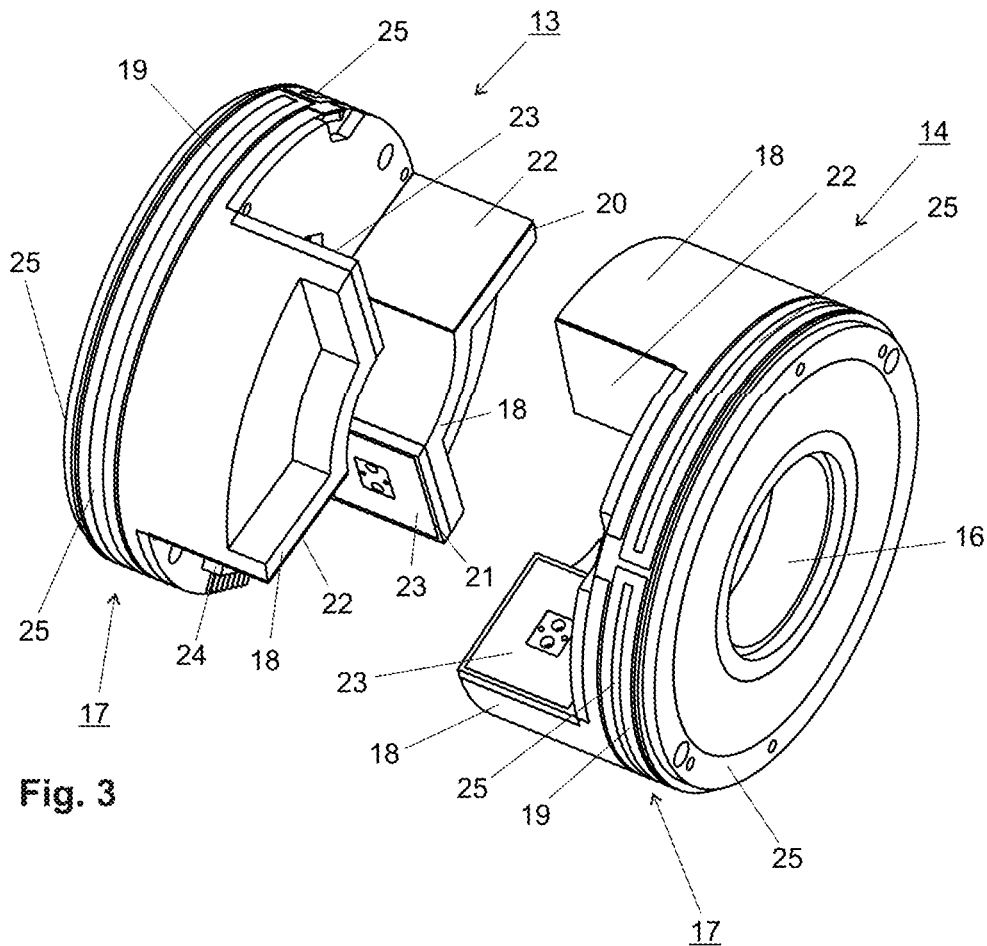
FIG. 3 is a spatial view of two components of a torque sensor.

FIGS. 2 and 3 show a torque sensor 12 of the electromechanical motor vehicle power steering system shown in FIG. 1, which has two cylindrical intermeshing components 13,14. The upper shaft 3 is connected to the lower shaft 30 via a torsion rod 15. A first component 13 is torsionally fixedly connected to the upper shaft 3 and a second component 14 is torsionally fixedly connected to the lower shaft 30. The two components 13,14 are connected to the corresponding shafts 3,30 at the opposite ends of the torsion rod 15 in the longitudinal direction. The components 13,14 surround the associated shaft 3,30 concentrically. They have a recess 16, preferably adapted to the outer shape of the shaft, which serves to attach the components 13,14 to the associated shaft. The two components 13,14 are identical. They have a base plate 17, which extends rotation-symmetrically around the longitudinal axis 100 of the shafts and from which two protrusions 18 protrude in the longitudinal direction on the same side. The protrusions 18 are arranged evenly distanced in the circumferential direction around the longitudinal axis 100 and extend along the radius from the recess 16 to the circumferential side 19 of the base plate. The protrusions 18 each preferably occupy a circular sector of less than 90°. The protrusions 18 can be of the same shape. At their two ends in the circumferential direction, the protrusions 18 each have flat surfaces 20,21 (end faces), which extend along the radius, over the entire height of the protrusions $h_v$. On one of the two flat surfaces 20 of a respective protrusion, a metallic element 22, in particular a conductive material forming a conductive sensor surface, is arranged, and a sensor coil 23 is arranged on the other flat surface 21. Each component 13,14 thus has two sensor coils 23 and two conductive sensor surfaces 22. In the circumferential direction, a conductive sensor surface 22 of one of the protrusions 18 and a sensor coil 23 of the other protrusion 18 of a single component 13,14 are spaced apart from each other. The components 13,14 intermesh in the mounted state. The protrusions 18 of the first component 13 are arranged in the circumferential direction between the protrusions 18 of the second component 14, so that a sensor coil 23 of the first component is arranged directly opposite a conductive sensor surface 22 of the second component 14 in the circumferential direction and facing each other and vice versa. A conductive sensor surface 22 and a sensor coil 23 arranged in the immediate vicinity each form a sensor pair, so that a total of four such sensor pairs are present. The overlapping of a sensor coil 23 and a conductive sensor surface 22 of a sensor pair in the longitudinal direction 100 is preferably at least 80% in each case.

The two components 13,14 are attached at the two ends of the torsion rod to the upper and lower shaft 3,30, so that with increasing torque the components 13,14 turn relative to each other, wherein the distance between the conductive sensor surface 22 and the sensor coil 23 of two sensor pairs becomes larger and the distance between the conductive sensor surface 22 and the sensor coil 23 of the other two sensor pairs becomes smaller. If the conductive sensor surface 22 is closer to the sensor coil 23, the inductance of the sensor coil decreases. The magnetic field of the sensor coil 23 induces eddy currents in the conductive sensor surface 22, and these currents form their own magnetic field, which weakens the field of the sensor coil 23, as a result of which the mutual inductance decreases. If, on the other hand, the conductive sensor surface 22 is further away from the sensor coil 23, the inductance increases. The sensor pairs form an inductive sensor, which preferably has three main elements—an oscillator, which is a system oscillating by itself, a frequency measuring unit which both compares and evaluates the data and an output unit which converts the values into an electrical signal. During operation, the inductive sensors generate a high-frequency alternating magnetic field with the help of the sensor coil. The fact that induced eddy currents are produced causes a change in the impedance of the sensor coil. This impedance counteracts the magnetic field and is electronically converted into a switching signal. If a metallic object (conductive sensor surface) moves in the resulting magnetic field, an eddy current is induced in the object, which counteracts the magnetic field and thus withdraws energy. The frequency change caused by a changing inductance is measured using a sensor unit based on a reference oscillator.

The sensor coil is therefore preferably arranged in a parallel oscillating circuit with a loopback inverter, the output signal of which has a rectangular shape. The sensor coil excitation is preferably sinusoidal and allows a better frequency design with regard to the multiplexing of multiple channels. The frequency of this signal is the resonance frequency of the parallel LC oscillating circuit.

The movement of the two components 13,14 of the torque sensor relative to each other allows a simple distance measurement in differential form, which is a robust measurement and allows a direct measurement of the torque. All four sensor pairs are preferably evaluated for the measurement.

The electronics required for the frequency measurement 24 sit on the surface of the base plate 19. Since the components 13,14 rotate with a steering movement, the power supply and the transmission of the measuring signals are wireless. On the base plate 19, therefore, a WPT coil (secondary coil) 25 is provided on the end face away from the protrusion, which receives electrical energy inductively and thus contactlessly from a primary coil 27 connected to the sensor housing 26 and thus supplies the electronics of the associated component with power.

The circumferential surface of the base plate 19 carries signal coupling coils (primary coils) 28 for transmitting the digital output signals of the sensor pairs from the corresponding component 13,14 to a secondary coil 29, which is attached to the stationary sensor housing 26. The connection is preferably made via a serial interface, in particular by means of UART on the component side and an RX receiving unit 31 on the secondary coil side.

In another embodiment, it may be provided that the signal transmission and power transmission take place via a single common coil. It may also be generally provided that the wireless transmission of the output signals is carried out by means of capacitive elements.

Figure 4:
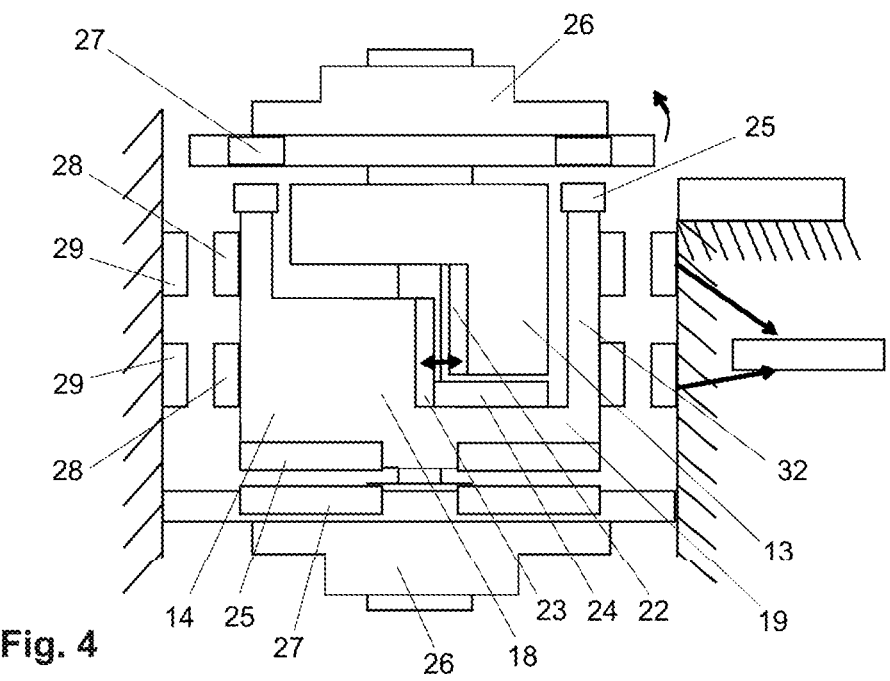
FIG. 4 is a longitudinal sectional view through an example torque sensor with electronics arranged on one side.

FIG. 4 shows an exemplary embodiment in which the sensor coils 23 are arranged on a first of the two components 14 and the conductive sensor surfaces 22 are arranged on the second component 13. The first component 14 is thus an active element that requires a power supply and the second component 13 is a passive element that does not require a power supply. The electronics required for frequency measurement 24 sit on the surface of the base plate 19 of the first component 14. The power supply of the first component 14 is carried out by means of two WPT coils (secondary coils) 25. The first component 14 is preferably pot-shaped and the protrusion 18 described in the other exemplary embodiments sits inside a jacket 32 on the base plate 19. The second component 13 is designed as described above. It is completely surrounded circumferentially by the first component 14. A first WPT coil 25 is arranged on the end face of the jacket surface 32 of the first component 14 and a second WPT coil 25 is arranged on the end face of the base. The WPT coils 25 accordingly receive power from two primary coils 27 connected to the sensor housing 26 and associated with the WPT coils 25 and can thus supply the electronics of the first component with power.

The circumferential surface of the jacket 32 of the first component 14 carries two signal coupling coils (primary coils) 28 for the transmission of the digital output signals of the sensor pairs from the first component 14 to a respective secondary coil 29, which is attached to the stationary sensor housing 26.

Figure 5:
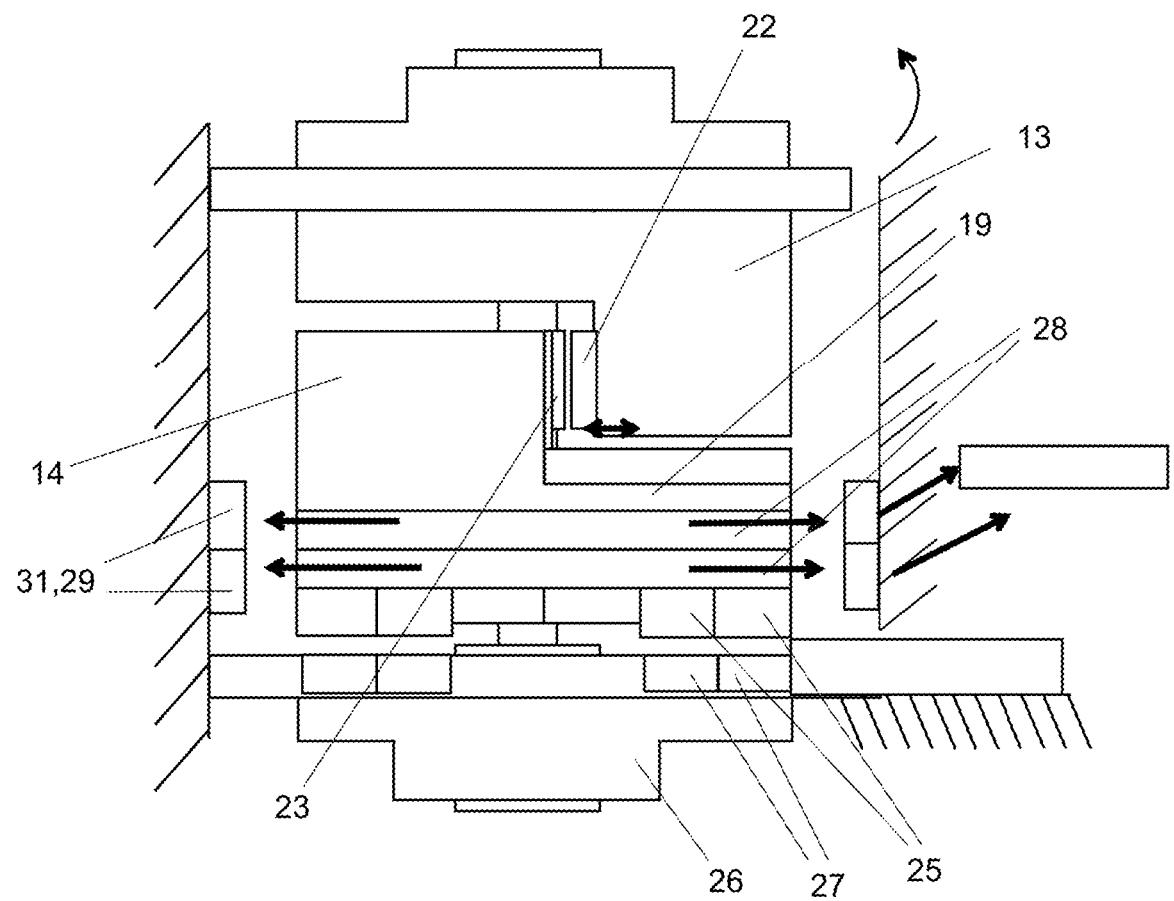
FIG. 5 is a longitudinal sectional view through an example torque sensor with electronics arranged on one side with concentrically arranged WPT coils.

FIG. 5 shows a further embodiment with which the sensor coils 23 are arranged on a first of the two components 14 and the conductive sensor surfaces 22 are arranged on the second component 13. Unlike the previous example, the two components 13,14 have essentially the same geometry. The power supply of the first component 14 is carried out by means of two WPT coils (secondary coils) 25, which are arranged in a concentric arrangement on the outer end face of the first component away from the protrusion. The WPT coils 25 receive power from two primary coils 27 connected to the sensor housing 26 and also concentrically arranged and can thus supply the electronics of the first component 14 with power.

The circumferential surface of the base plate 19 of the first component 14 carries two signal coupling coils (primary coils) 28 for the transmission of the digital output signals of the sensor pairs from the first component 13 to two secondary coils 29 attached to the stationary sensor housing 26. The connection is preferably made via a serial interface, in particular by means of RX receiving units 31 on the secondary coil side.

The exemplary embodiments shown in the figures comprise a total of four pairs of sensors. However, the principle is generally also applicable to the presence of at least two pairs of sensors. The more sensor pairs are provided, the higher the resolution of the torque measurement.

What is claimed is:

1. A torque sensor for measuring a torque introduced into an upper shaft of a motor vehicle, wherein the upper shaft is rotatable around a longitudinal axis and is connectable to a lower shaft via a torsion rod, wherein the torque sensor comprises:
    a first component intermeshing in a longitudinal direction of the longitudinal axis with a second component, wherein the first component is connectable to the upper shaft and the second component is connectable to the lower shaft, wherein the first and second components each have a surface that protrudes in the longitudinal direction, wherein the surfaces of the components at least partially overlap in the longitudinal direction; and
    an inductive sensor comprising a metallic element and a sensor coil, the sensor coil configured to generate a high-frequency alternating magnetic field, wherein the sensor coil is arranged on the surface of one of the first or second components and the metallic element is arranged on the first surface of the other of the first or second components, wherein a torque introduced into the upper shaft causes a change in distance between the sensor coil and the metallic element; and
    wherein the inductive sensor is configured to measure a frequency change of the high-frequency alternating magnetic field caused by the change in distance and determine the torque introduced into the upper shaft.

2. The torque sensor of claim 1 wherein the first component is substantially cylindrical and concentrically surrounds the upper shaft, wherein the second component is substantially cylindrical and concentrically surrounds the lower shaft.

3. The torque sensor of claim 1 wherein each of the first and second components includes a circular base plate from which a protrusion extends over a circular sector, wherein the protrusion and/or a lateral surface thereof forms the surface of each component and extends in the longitudinal direction and along a radius of the circular base plate.

4. The torque sensor of claim 3 wherein electronics of the device required for measuring the frequency change are disposed on a surface of the circular base plate.

5. The torque sensor of claim 3 comprising a WPT coil that is disposed on a surface of the circular base plate remote from the protrusion, with the WPT coil being configured to receive electrical energy inductively from a primary coil connected to a sensor housing.

6. The torque sensor of claim 3 comprising signal coupling coils disposed on a circumferential surface of the circular base plate, with the signal coupling coils being configured to transmit digital output signals of the pair of sensors to a secondary coil that is attached to a stationary sensor housing.

7. The torque sensor of claim 1 wherein the surface of the first and second components are flat.

8. The torque sensor of claim 1 comprising two protrusions that are identical, wherein the two protrusions are disposed along a circumference symmetrically around the longitudinal axis on a common side of the base plate.

9. The torque sensor of claim 1 wherein the first component is identical to the second component.

10. An electromechanical power steering system for a motor vehicle, comprising:
   an upper shaft connected to a steering wheel;
   a lower shaft connected to the upper shaft via a torsion rod;
   the torque sensor of claim 1; and
   an electric motor configured to support a steering movement introduced into the steering wheel by a driver based on a torque measured by the torque sensor.

* * * * *